(12) United States Patent
Kendrick et al.

(10) Patent No.: US 6,921,798 B2
(45) Date of Patent: Jul. 26, 2005

(54) POLYMERIZATION PROCESS

(75) Inventors: James A. Kendrick, Baton Rouge, LA (US); Scott T. Roger, Baton Rouge, LA (US); Stanley J. Katzen, Baton Rouge, LA (US); Zerong Lin, Kingwood, TX (US); Anthony N. Speca, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/456,283

(22) Filed: Jun. 6, 2003

(65) Prior Publication Data

US 2003/0232935 A1 Dec. 18, 2003

Related U.S. Application Data

(60) Provisional application No. 60/389,179, filed on Jun. 17, 2002.

(51) Int. Cl.$^7$ .................................................. C08F 2/00
(52) U.S. Cl. ........................ 526/64; 526/75; 526/106; 526/348.5; 526/352
(58) Field of Search ............................ 526/64, 75, 106, 526/348.5, 352

(56) References Cited

U.S. PATENT DOCUMENTS

| | | | |
|---|---|---|---|
| 2,825,721 A | 3/1958 | Hogan et al. ............... | 260/88.1 |
| 3,887,494 A | 6/1975 | Dietz ........................... | 252/452 |
| 4,735,931 A | 4/1988 | McDaniel et al. ........... | 502/107 |
| 5,071,927 A | * 12/1991 | Benham et al. ............... | 526/64 |
| 5,331,070 A | 7/1994 | Pettijohn et al. ............. | 526/105 |
| 5,786,431 A | 7/1998 | Reagen et al. ............... | 526/113 |
| 6,174,981 B1 | 1/2001 | Bergmeister et al. ..... | 526/348.2 |

FOREIGN PATENT DOCUMENTS

| | | | |
|---|---|---|---|
| EP | 0 307 907 | 3/1989 | ........... C08F/10/00 |
| EP | 0 480 377 | 4/1994 | ........... C08F/10/00 |
| EP | 0 885 656 | 12/1998 | ........... B01J/31/14 |
| EP | 1 172 381 | 1/2002 | ........... C08F/10/00 |
| EP | 1 172 381 A1 | 1/2002 | ........... C08F/10/00 |

OTHER PUBLICATIONS

Abstract from MicroPatent for EP 0 885 656, entitled Catalytic Composition and Ethylene Oligomerization, Especially in 1-Butene and/or 1-Hexene, published Dec. 23, 1998 (see AO).

* cited by examiner

*Primary Examiner*—William K. Cheung
(74) *Attorney, Agent, or Firm*—Andrew B. Griffis; Maria C. Walsh

(57) ABSTRACT

Polymerization processes are disclosed for producing polyethylene having a target density and improved environmental stress resistance. Ethylene and optionally one or more α-olefin comonomers, supported chromium catalyst, and metal alkyl cocatalyst are contacted to produce polyethylene. The density of the polyethylene is determined, and the concentration of cocatalyst is adjusted in response to a deviation between the density of the polyethylene and the target density. The catalyst and cocatalyst can be fed separately into the reactor, or can be co-fed, eliminating the need to pre-contact the catalyst and cocatalyst prior to introducing them into the reactor.

16 Claims, No Drawings

POLYMERIZATION PROCESS

CROSS-REFERENCE TO RELATED APPLICATION

This application claims the benefit of priority of U.S. application Ser. No. 60/389,179 filed Jun. 17, 2002.

FIELD OF THE INVENTION

The invention is generally directed to methods of polymerizing ethylene to form polyethylene. In particular, the invention provides methods of polymerizing ethylene with or without addition of comonomer, in the presence of a supported chromium catalyst and metal alkyl cocatalyst, in a gas phase reactor or a slurry reactor.

BACKGROUND

Chromium catalysts, sometimes termed Phillips catalysts, are well known catalysts for olefin polymerization. In these catalysts, a chromium compound, such as chromium oxide, is supported on a support of one or more inorganic oxides such as silica, alumina, zirconia or thoria, and activated by heating in a non-reducing atmosphere. U.S. Pat. No. 2,825,721 describes chromium catalysts and methods of making the catalysts. It is also known to increase polymer melt index by using a silica-titania support as disclosed, for example, in U.S. Pat. No. 3,887,494.

European patent application EP 1 172 381 A1 discloses a method for producing ethylene polymers reputedly having improved environmental stress crack resistance (ESCR) using a trialkylaluminum compound-carried chromium catalyst. The activated chromium compound on an inorganic support is treated with a trialkylaluminum compound in an inert hydrocarbon solvent and the solvent removed to form a trialkylaluminum-carried chromium catalyst. EP 1 172 381 A1 discloses that the time of contact with the solvent must be minimized to avoid over-reduction and associated degradation of polymer properties. The reference further teaches that for ESCR and impact resistance it is essential to use hydrogen in a carefully controlled hydrogen-ethylene ratio. The need for careful control of contact time, hydrogen concentration, and amount of trialkylaluminum used in the catalyst synthesis in order to achieve desired polymer properties limits the usefulness of such methods.

U.S. Pat. No. 6,174,981 discloses a process of polymerizing ethylene and at least one $C_3$ to $C_8$ mono-olefin in the presence of a catalyst including chromium supported on a silica-titania support and a trialkylboron compound. The process, however, produces resins that generally have density and HLMI (high load melt index, $I_{21.6}$) values lower than would be desirable for some applications. It would be desirable to have processes to controllably produce resins for such applications as containers for household industrial chemicals, drainage, pressure and conduit pipe, industrial bulk containers such as drums, and geomembranes.

SUMMARY OF THE INVENTION

In one embodiment, the invention provides a polymerization process for producing polyethylene having a target density without addition of comonomer, by: contacting ethylene, a supported chromium catalyst, and a Group 13 metal alkyl cocatalyst to produce polyethylene; determining the density of the polyethylene; and adjusting the concentration of cocatalyst in response to a deviation between the density of the polyethylene and the target density. The catalyst and cocatalyst can be fed separately into the reactor, or can be co-fed. Advantageously, the process eliminates the need to pre-contact the catalyst and cocatalyst prior to introducing them into the reactor. Further, the process produces polyethylene of a desired density, typically in the range of 0.935 to 0.960 g/cm$^3$, without addition of comonomer.

In another embodiment, the invention provides a polymerization process for producing polyethylene having a target density, by: contacting ethylene, alpha-olefin comonomer, supported chromium catalyst, and Group 13 metal alkyl cocatalyst to produce polyethylene; determining the density of the polyethylene; and adjusting the concentration of cocatalyst in response to a deviation between the density of the polyethylene and the target density. The catalyst and cocatalyst can be fed separately into the reactor, or can be co-fed. Advantageously, the process eliminates the need to pre-contact the catalyst and cocatalyst prior to introducing them into the reactor.

In another embodiment, the invention provides a polymerization process for producing polyethylene having a target density, by: contacting ethylene, alpha-olefin comonomer, supported chromium catalyst, and Group 13 metal alkyl cocatalyst to produce polyethylene; determining the density of the polyethylene; and adjusting the concentration of cocatalyst in response to a deviation between the density of the polyethylene and the target density until the deviation between the density of the polyethylene and the target density is less than a predetermined value. Once the target density has thus been achieved, the density of the polyethylene is monitored, and the concentration of comonomer is adjusted in response to a deviation between the density of the polyethylene and the target density. The catalyst and cocatalyst can be fed separately into the reactor, or can be co-fed. Advantageously, the process eliminates the need to pre-contact the catalyst and cocatalyst prior to introducing them into the reactor.

In another embodiment, the invention provides a polymerization process for producing polyethylene having a target density, by: contacting ethylene, alpha-olefin comonomer, supported chromium catalyst, and Group 13 metal alkyl cocatalyst to produce polyethylene; determining the density of the polyethylene; and adjusting the concentration of cocatalyst in response to a deviation between the density of the polyethylene and the target density. The process is carried out at constant comonomer concentration. The catalyst and cocatalyst can be fed separately into the reactor, or can be co-fed. Advantageously, the process eliminates the need to pre-contact the catalyst and cocatalyst prior to introducing them into the reactor.

The processes provide resins particularly suitable for pipe and drum applications; i.e., resins having suitable density and resistance to environmental stress. Thus, in some embodiments, the inventive processes provide polyethylene with ESCR of at least 50 hr, at least 100 hr, at least 500 hr, at least 750 hr, or at least 1000 hr, as determined by ASTM D 1693, condition B (10% IGEPAL™). In some embodiments, the inventive processes provide polyethylene with Notched Constant Tensile Load (NCTL), a stress crack resistance test for highway drainage pipe, of at least 10 hr or at least 15 hr or at least 25 hr or at least 50 hr or at least 75 hr, as measured in accordance with ASTM D-5397-99.

In other embodiments, the invention provides polyethylene resins produced by the inventive processes, and articles formed of such resins. Typical articles include, for example, containers for household industrial chemicals, drainage, pressure and conduit pipe, industrial bulk containers such as drums (typically 30 or 50 gallon drums), and geomembranes.

DETAILED DESCRIPTION

Catalyst System

The catalyst system includes a supported chromium catalyst and a cocatalyst. Supported chromium catalysts are well known, and are described, for example, in U.S. Pat. No. 2,825,721. In general, such catalysts include a chromium compound supported on an inorganic oxide matrix. Typical supports include silicon, aluminum, zirconium and thorium oxides, as well as combinations thereof. Various grades of silica and alumina support materials are widely available from numerous commercial sources.

In a particular embodiment, the support is silica. A suitable silica is a high surface area, amorphous silica, such as a material marketed under the tradenames of Davison 952 or Davison 955 by the Davison Chemical Division of W.R. Grace and Company. These silicas are in the form of spherical particles obtained by a spray-drying process, and have a surface area of about 300 $m^2/g$, and a pore volume of about 1.65 $cm^3/g$. Granular silica can also be used.

In another embodiment, the support is a silica-titania support. Silica-titania supports are well known in the art and are described, for example, in U.S. Pat. No. 3,887,494. Silica-titania supports can be produced as described in U.S. Pat. Nos. 3,887,494, 5,096,868 or 6,174,981 by "cogelling" or coprecipitating silica and a titanium compound. Such a cogel can be produced by contacting an alkali metal silicate such as sodium silicate with an acid such as sulfuric acid, hydrochloric acid or acetic acid, or an acidic salt. The titanium component can be conveniently dissolved in the acid or alkali metal silicate solution and co-precipitated with the silica. The titanium compound can be incorporated in the acid in any form in which it subsequently will be incorporated in the silica gel formed on combination of the silicate and the acid and from which form it is subsequently convertible to titanium oxide on calcination. Suitable titanium compounds include, but are not limited to, halides such as $TiCl_3$ and $TiCl_4$, nitrates, sulfates, oxalates and alkyl titanates. In instances where carbon dioxide is used as the acid, the titanium can be incorporated into the alkali metal silicate itself. When using acidic salts, the titanium compound can be incorporated in the alkali metal silicate and in such instances, convenient titanium compounds are water soluble materials which do not precipitate the silicate, i.e., are those convertible to titanium oxide on calcination such as, for example, various titanium oxalates, such as $K_2TiO(C_2O_4)_2 \cdot H_2O$, $(NH_4)_2TiO(C_2O_4)_2 \cdot H_2O$ and $Ti_2(C_2O_4)_3 \cdot H_2O$. As used herein, the term "silica-titania" support includes supports formed by any of these coprecipitation or cogel processes, or other processes by which titania and silica are both incorporated into the support.

In another embodiment, titanium is incorporated by surface-modifying a supported chromium catalyst. As used herein, the term "titanium surface-modified supported chromium catalyst" is meant to include any supported chromium catalyst that is further modified to include titanium; see, e.g., C. E. Marsden, *Plastics, Rubber and Composites Processing and Applications*, 21 (1994), 193–200. For example, it is known to modify supported chromium catalysts by slurrying the chromium catalyst in a hydrocarbon and contacting the slurry with a titanium alkoxide, $Ti(OR)_4$, and heating to form a dried, titanium surface-modified supported chromium catalyst. The alkyl group R of the alkoxide can be a $C_3$ to $C_8$ linear or branched alkyl group; a particular example of a suitable titanium alkoxide is titanium tetraisopropoxide. Another method of titanating a supported chromium catalyst is to heat a solid supported chromium catalyst and a solid titanium compound such as titanium tetraacetoacetate under gas fluidization conditions, whereby the titanium compound sublimes and titanium is deposited on the supported chromium catalyst, possibly as a titanium oxide.

The titanium compound preferably is generally present in an amount of from a lower limit of 0.5% or 1% or 2% or 3% or 5% titanium by weight to an upper limit of 12% or 10% or 8% or 6% by weight, with ranges from any lower limit to any upper limit being contemplated.

The chromium compound can be incorporated in any convenient method known in the art. For example, a chromium compound and optionally a titanium compound, is dissolved in an acidic material or the silicate and thus coprecipitated with the silica. A suitable chromium compound for this method is chromic sulfate. Another method to incorporate a chromium compound into the catalyst system is to use a hydrocarbon solution of a chromium compound convertible to chromium oxide to impregnate the support after it is spray dried or azeotrope dried (i.e., a xerogel). Exemplary of such materials are t-butyl chromate, chromium acetylacetonate, and the like. Suitable solvents include, but are not limited to, pentane, hexane, benzene, and the like. Alternatively, an aqueous solution of a chromium compound simply can be physically mixed with the support. These types of catalyst systems are disclosed in U.S. Pat. No. 3,887,494.

Chromium can be present in the catalyst an amount from a lower limit of 0.1 or 0.5 or 0.8 or 1.0% or 1.5% by weight to an upper limit of 10% or 8% or 5% or 3% % by weight, with ranges from any lower limit to any upper limit being contemplated.

Supported chromium catalysts are commercially available. Suitable commercially available chromium catalysts include HA30W and HA30LF, products of W. R. Grace & Co., containing about 1% Cr by weight.

Supported titanium-chromium catalysts are also commercially available. Suitable commercially available titanium-chromium catalysts include titanium-surface modified chromium catalysts from PQ Corporation such as C-23307, C-25305, C-25345, C-23305, and C-25307. Commercially available titanium-surface modified chromium catalysts typically contain about 1–5% Ti and 1% Cr by weight.

In any of the supports described above, the support can also include other inorganic oxides, such as alumina, thoria or zirconia. Further, the support can be treated by various methods known in the art, such as by fluoridation.

The catalyst is activated prior to use by heating the dry catalyst system in a non-reducing atmosphere, conveniently in air or in an oxygen-enriched atmosphere. The calcination temperature can be from 400 or 450 or 500 or 550° C. to 900 or 800 or 700° C., with ranges from any lower limit to any upper limit being contemplated. In a particular embodiment, the calcination temperature is greater than 600° C. Typical heating times can be for 30 minutes to 50 hours, with 2 to 20 hours being generally sufficient. Without wishing to be bound by theory, it is generally believed that the calcination procedure results in at least a substantial portion of the chromium being oxidized to a hexavalent form. Calcination is conveniently carried out in a stream of fluidizing air wherein the stream of fluidizing air is continued as the material is cooled. As a specific example, the catalyst can be placed in a cylindrical tube and fluidized in dry air at about 2 feet per minute linear velocity while being heated to a pre-determined temperature, typically 400 to 900° C., and held at temperature for about 6 hr. The activated catalyst is recovered as a free-flowing powder. Catalysts can also be activated with a sequence of gaseous compositions. For example, the catalyst can be first heated in nitrogen to a first temperature, followed by air at a second temperature, then cooled under nitrogen to ambient temperature. Activation can also involve a short period using carbon monoxide as the fluidization gas between the air and/or nitrogen steps. At the end of activation the catalyst is cooled to ambient temperature and stored under nitrogen for use in the polymerization reactor.

The catalyst is used in conjunction with a cocatalyst, as described below. In general, the cocatalyst can be a metal alkyl of a Group 13 metal. The cocatalyst can be a compound of formula $MR_3$, where M is a group 13 metal, and each R is independently a linear or branched $C_1$ or $C_2$ or $C_4$ to $C_{12}$ or $C_{10}$ or $C_8$ alkyl group. Mixtures of two or more such metal alkyls are also contemplated, and are included within the term "cocatalyst" as used herein.

In a particular embodiment, M is boron. In a specific aspect of this embodiment, each R is ethyl; i.e., the cocatalyst is triethylboron (TEB).

In another particular embodiment, M is aluminum. Particular examples of suitable cocatalysts in this embodiment are tri-isobutylaluminum (TIBAL) and tri-n-octylaluminum (TNOA).

In some embodiments, the cocatalyst can be used in an amount in accordance with (I), or (II) or both (I) and (II):

The concentration of cocatalyst in the reaction diluent is from 0.1 or 1 or 5 or 10 or 20 or 30 or 40 ppm to 100 or 90 or 80 or 70 or 60 ppm, with ranges from any lower limit to any upper limit being contemplated. The concentration of cocatalyst is expressed as parts by weight of cocatalyst per million parts by weight of the diluent phase.

The ratio of moles of cocatalyst to moles of chromium is from a lower limit of 0.1:1 or 0.5:1 or 1:1 or 2:1 or 3:1 or 4:1 to an upper limit of 10:1 or 8:1 or 7:1 or 6:1, with ranges from any lower limit to any upper limit being contemplated.

More or less cocatalyst can be used, depending upon the amount of poisons present in the reaction system. Poisons in the reactor that can consume or deactivate the cocatalyst include, for example, as oxygen, water, carbon monoxide or carbon dioxide.

In one embodiment, the catalyst system is formed in a polymerization reactor, by providing a supported chromium catalyst and a trialkylaluminum cocatalyst as described above; and contacting the catalyst and cocatalyst to form a catalyst system. The catalyst and cocatalyst can be contacted by cofeeding the catalyst and cocatalyst to the reactor, or feeding the catalyst and cocatalyst separately to the reactor. The catalyst and cocatalyst are not contacted prior to the step of feeding or cofeeding.

In another embodiment, the catalyst system is formed in a polymerization reactor, by providing a supported chromium catalyst activated at a temperature of greater than 600° C. and a Group 13 metal alkyl cocatalyst as described above; and contacting the catalyst and cocatalyst to form a catalyst system. The catalyst and cocatalyst can be contacted by cofeeding the catalyst and cocatalyst to the reactor, or feeding the catalyst and cocatalyst separately to the reactor. The catalyst and cocatalyst are not contacted prior to the step of feeding or cofeeding.

Polymerization Process

The methods of the invention can generally be carried out in a slurry reactor, such as a stirred slurry reactor or a slurry loop reactor, or in a gas phase reactor. For illustrative purposes, the methods are described below with particular reference to a slurry loop reactor. However, it should be appreciated that the methods are not limited to this particular reactor configuration.

A slurry loop olefin polymerization reactor can generally be described as a loop-shaped continuous tube. In some instances, the reactor design may be generally "O" shaped. One or more fluid circulating devices, such as an axial pump, urge the reactor constituents within the tube in a desired direction so as to create a circulating current or flow of the reactor constituents within the tube. Desirably, the fluid circulating devices are designed to provide high velocity of motion and a very intensive and well-defined mixing pattern of the reactor constituents. The reactor may be totally or partially jacketed with cooling water in order to remove heat generated by polymer polymerization.

In the slurry loop olefin polymerization reactor, the polymerization medium includes monomer, optional comonomer, and a hydrocarbon solvent or diluent, advantageously aliphatic paraffin such as propane, isobutane, hexane, heptane, or cyclohexane, for example, or an aromatic diluent such as toluene, or mixtures thereof. The polymerization is carried out at a temperature of from a lower limit of 50 or 60 or 70 or 80 or 90° C. to an upper limit of 150 or 140 or 130 or 120 or 110 or 100° C., with ranges from any lower limit to any upper limit being contemplated. In a particular embodiment, the polymerization is carried out at a temperature of greater than 95° C. or greater than 100° C. In another particular embodiment, the polymerization is carried out at a temperature $T_R$ of from greater than 100° C. to 110° C. (i.e., 100° C.<$T_R$≦110° C.). Pressures can vary from about 100 to about 700 psia (0.69–4.8 MPa). Additional description is given in U.S. Pat. Nos. 5,274,056 and 4,182,810 and PCT publication WO 94/21962. As such, the reactor constituents generally are a combination of both solids, such as supported catalyst and polymerized olefin, and liquids, such as those described above. The percentage of solids within the reactor constituents may be as high as 60 wt % of the reactor constituents. Typically, the weight percent of solids is in the range of 45 to 55 wt %.

The slurry loop olefin polymerization reactor may be operated in a single stage process or in multistage processes. In multistage processing, the polymerization of olefins is carried out in two or more reactors. These reactors can be configured in series, in parallel, or a combination thereof.

The methods of the invention are used in the slurry polymerization of ethylene to form polyethylene homopolymer or copolymer having the properties described herein. In some embodiments, the methods are carried out without addition of comonomer; i.e., the monomer feed is essentially ethylene, with no comonomer intentionally added, although it should be appreciated that minor amounts of other polymerizable olefins may be present in the ethylene feedstock, typically less than 1% or less than 0.5% or less than 0.1% or less than 0.05% or less than 0.01% by weight. Without wishing to be bound by theory, it is believed that processes of the invention result in formation in situ of polymerizable comonomer, which is then incorporated into the polyethylene. Thus, polyethylenes formed in processes of the invention even without addition of comonomer can have short chain branching and other properties typically associated with polyethylene copolymers.

In some embodiments, both ethylene and at least one comonomer are provided to the reactor. Suitable comonomers include α-olefins, such as $C_3$–$C_{20}$ α-olefins or $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene.

Other useful comonomers include conjugated and non-conjugated dienes, which can be included in minor amounts in terpolymer compositions. Non-conjugated dienes useful as co-monomers preferably are straight chain, hydrocarbon diolefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclooctadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB).

The amount of comonomer used will depend upon the desired density of the polyolefin and the specific comonomers selected. One skilled in the art can readily determine the appropriate comonomer content appropriate to produce a polyolefin having a desired density. As used herein, the term "comonomer" includes mixtures of two or more comonomers.

The catalyst and cocatalyst can be fed separately into the slurry reactor, such as through separate inlets or sequentially through a common inlet, or can be co-fed. As used herein, the term "co-fed" means that catalyst and cocatalyst feedstreams are combined and fed together into the reactor. This cofeeding or combining of feedstreams, is different from the pre-contacting required in the prior art, such as in EP 1 172 381, wherein a supported chromium catalyst is treated with trialkylaluminum cocatalyst and dried to produce a dry catalyst of fixed Al:Cr ratio, prior to introducing the catalyst to a polymerization reactor. Processes of the invention advantageously eliminate the need for such pre-contacting steps.

In some embodiments, the invention provides methods of producing polyethylene having a target density. The density of the polyethylene can be determined by a real-time, on-line analysis technique which correlates rapidly measurable parameters to polymer density, such as online spectroscopic techniques as described in PCT Publication WO 01/09203 and U.S. Provisional Application Serial No. 60/345337. Alternatively, polyethylene density can be determined by periodically sampling the polyethylene and determining the density according to ASTM D1505-68 and ASTM D1928.

The concentration of cocatalyst is adjusted in response to a deviation between the density of the polyethylene and the target density. To reduce the polymer density, the concentration of cocatalyst can be increased, by increasing the feed rate of cocatalyst to the reactor. Conversely, to increase the polymer density, the concentration of cocatalyst can be decreased, by decreasing the feed rate of cocatalyst to the reactor. The concentration of cocatalyst can be determined by sampling the reaction medium, if desired. However, it is a particular advantage of the present processes that the actual concentration of cocatalyst need not be measured. Thus, cocatalyst is fed to the reactor to provide a nominal cocatalyst concentration, and thereafter, the cocatalyst concentration is adjusted, in some embodiments, in response to deviations between the measured polymer density and the target density. The cocatalyst concentration is adjusted, but the actual concentration within the reaction medium does not need to be determined.

Once a target density is reached, the concentration of cocatalyst will generally require adjustment only if the level of active cocatalyst changes, due to variations in the quantity of poisons in the reactor. The indicator that such a change has occurred will be an increase in the polymer density if the poisons level has increased, or a decrease in polymer density if the poisons level has decreased. Adjusting the concentration of cocatalyst thus provides a process for obtaining polyethylene with a target density. Adjustment of cocatalyst concentration or feed rate can be carried out by any desired method, such as by manual operator control, or by an automated computer-based control system, such as are well known in the art.

In some embodiments, ethylene is polymerized without intentional addition of comonomer. Although not wishing to be bound by theory, it is believed that polymerization of ethylene in the presence of a supported chromium catalyst and a cocatalyst generates alpha-olefins as a polymerization by-product. The in situ generated alpha-olefin can copolymerize with the ethylene to produce polyethylene copolymer with short chain branching, without addition of comonomer. The short chain branching decreases polymer density. Increasing the concentration of cocatalyst in the reactor increases the amount of in situ comonomer generation, which improves the ESCR and decreases polymer density. It is believed that the in situ alpha-olefins produced are short chain alpha-olefins such as butene, hexene, octene and decene, and these comonomers are believed to provide short chain branches in the copolymer of varying lengths and more evenly distributed in the polymer chain than separately added comonomer. As a result, it is believed that in-situ generated comonomer is more effective at improving polymer ESCR than equivalent quantities of added comonomer, for a given polymer density.

If the desired density is not achieved with in situ generated comonomer alone, in another embodiment, alpha-olefin comonomer can be fed to the reactor.

In another embodiment, the invention provides a slurry polymerization process for producing polyethylene having controlled ESCR and density, where the ESCR can be controlled independent from density. In this embodiment, ethylene and at least one alpha-olefin comonomer, supported chromium catalyst and cocatalyst are contacted in a slurry reactor to produce polyethylene. The density of the polyethylene is determined, and the concentration of cocatalyst in the reactor is adjusted in response to a deviation between the density of the polyethylene and a target density untill the deviation between the density of the polyethylene and the target density is less than a predetermined value. The predetermined value can be, for example, ±0.005 or ±0.003 or ±0.001 or ±0.0005 g/cm³. The adjustment of cocatalyst to achieve the target density can be carried out at a fixed comonomer concentration.

In one embodiment, once the target density has thus been achieved within the required tolerance, the density of the polyethylene is monitored, and the concentration of comonomer is adjusted in response to a deviation between the density of the polyethylene and the target density.

In another embodiment, once the target density has thus been achieved within the required tolerance, the density of the polyethylene is monitored, and the concentration of cocatalyst is adjusted in response to a deviation between the density of the polyethylene and the target density, at constant comonomer concentration.

In any of the embodiments described herein, hydrogen can be used if desired to control the molecular weight, as is well known in the art.

Product

The polyethylene produced in the methods of the invention shows improved properties such as environmental stress crack resistance (ESCR). ESCR is a measure of a polyethylene's resistance to cracking under stress and in the presence of an organic reagent such as a surfactant. ESCR is determined in accordance with ASTM D 1693, condition B, 10% IGEPAL™.

In various embodiments, the polyethylene product has one or more of the following properties:

an ESCR of at least 50 hr or at least 100 hr or at least 500 hr or at least 750 hr or at least 1000 hr;

a notched constant tensile load (NCTL) of at least 10 hr or at least 15 hr or at least 25 hr or at least 50 hr;

a high load melt index ($I_{21.6}$) of from a lower limit of 0.1 or 0.5 or 1 or 10 or 20 or 30 or 40 g/10 min to an upper limit of 100 or 80 or 60, with ranges from any lower limit to any upper limit being contemplated;

a melt index ($I_{2.16}$) of from a lower limit of 0.01 or 0.1 or 0.5 or 1 or 10 or 20 or 30 or 40 g/10 min to an upper limit of 100 or 80 or 60, with ranges from any lower limit to any upper limit being contemplated; and a density of from a lower limit of 0.935 or 0.940 or 0.945 or 0.950 g/cm³ to an upper limit of 0.960 or 0.955 g/cm³, with ranges from any lower limit to any upper limit being contemplated.

Advantageously, the methods of the present invention can be used to produce polyethylene having consistent ESCR and density.

EXAMPLES

Environmental Stress Crack Resistance (ESCR) (bent strip) is determined in accordance with ASTM D 1693, condition B, 10% IGEPAL™. IGEPAL™ is a nonylphenoxy poly(ethylenoxy)ethanol surfactant available from Rhone Polenc, Cranbury, N.J. All ESCR values cited herein are ASTM D 1693 condition B, 10% IGEPAL™ F50 values, and are given in units of hours.

Polymer density (g/cm³) is determined using a compression molded sample, cooled at 15° C. per hour and conditioned for 40 hours at room temperature according to ASTM D1505-68 and ASTM D1928, procedure C.

Polymer melt flow rates can be determined at 190° C. according to ASTM D-1238-57T. $I_{21.6}$ is the "flow index" or melt flow rate of the polymer measured according to ASTM D-1238-57T, condition F, and $I_{2.16}$ is the "melt index" or melt flow rate of the polymer measured according to ASTM D-1238-57T, condition E. The ratio of $I_{21.6}$ to $I_{2.16}$ is the "melt flow ratio" or "MFR". The melt flow rate $I_{21.6}$ is also sometimes termed the "high load melt index" or HLMI. Melt flow rates are reported in units of grams per 10 minutes (g/10 min) or equivalently decigrams per minute (dg/min).

Polymerizations were carried out using HA30LF, a commercially available silica supported chromium catalyst containing about 1% Cr by weight, and available from W. R. Grace & Co.

All patents, test procedures, and other documents cited herein, including priority documents, are fully incorporated by reference to the extent such disclosure is not inconsistent with this invention and for all jurisdictions in which such incorporation is permitted.

Having thus described the invention in detail above, the following is intended to set forth, without limitation, preferred embodiments: a process for producing polyethylene having a target density, the process comprising: (a) contacting, under polymerization conditions: (i) monomers comprising ethylene; (ii) supported chromium catalyst; and (iii) cocatalyst selected from metal alkyls of group 13 metals, to produce polyethylene; (b) determining the density of the polyethylene; and (c) adjusting the concentration of cocatalyst in response to a deviation between the density of the polyethylene and the target density; and the foregoing with one or more of the following even more preferred embodiments: wherein the process is carried out without addition of alpha-olefin comonomer; wherein the process is carried out with addition of alpha-olefin comonomer; wherein the contacting is under slurry polymerization conditions and the process is carried out at fixed comonomer conditions; wherein the process is carried out in a slurry reactor; wherein the supported chromium catalyst comprises chromium supported on a silica-titania support; wherein the supported chromium catalyst comprises titanium surface-modified supported chromium catalyst; wherein the cocatalyst comprises a compound of formula $MR_3$, where M is a Group 13 metal, and each R is independently a linear or branched $C_1$ to $C_{12}$ alkyl group, preferably a $C_4$ to $C_8$ alkyl group, more preferably wherein each R is an ethyl group; wherein M is boron, aluminum, or a mixture thereof; wherein the cocatalyst comprises tri-isobutylaluminum or tri-n-octylaluminum; wherein the step of contacting comprises feeding catalyst and cocatalyst separately into a polymerization reactor; wherein the step of contacting comprises cofeeding catalyst and cocatalyst into a polymerization reactor; wherein the polymerization is carried out at a temperature of from 80° C. to 120° C., preferably at a temperature greater than 100° C., more preferably at a temperature of from greater than 100° C. to 110° C.; wherein prior to the step of contacting, the catalyst is activated by heating to a temperature of from 400° C. to 900° C., and preferably greater than 600° C.; wherein the polyethylene has a high load melt index (melt flow rate $I_{21.6}$) of 0.1 to 100 g/10 min, and preferably at least 10 g/10 min, more preferably at least 20 g/10 min; wherein the polyethylene has a melt index ($I_{2.16}$) of 0.01 to 100 g/10 min; wherein the density of the polyethylene is 0.935 to 0.960 g/cm³, preferably 0.950 to 0.960 g/cm³; wherein the polyethylene has an environmental stress crack resistance (ESCR) of at least 50 hr, preferably at least 500 hr; wherein the polyethylene has a notched constant tensile load (NCTL) of at least 50 hr; and also a preferred embodiment directed to a polyethylene resin produced by the process according to any one of the preceding preferred and one or more preferred embodiments; and also a preferred embodiment directed to an article comprising said polyethylene resin, particularly wherein the article is a container for household industrial chemicals, a drainage pipe, a pressure pipe, a conduit pipe, a drum, or a geomembrane.

What is claimed is:

1. A process for producing polyethylene having a target density, the process comprising:
   (a) contacting, under polymerization conditions:
      (i) monomers comprising ethylene;
      (ii) supported chromium catalyst; and
      (iii) cocatalyst is selected from metal alkyls of the group consisting of aluminum, gallium, indium, and thallium, to produce polyethylene having a deviation between the density of said polyethylene and said target density;
   (b) determining the density of said polyethylene; and
   (c) adjusting the concentration of cocatalyst in response to said deviation between the density of said polyethylene and said target density.

2. The process of claim 1, wherein the process is carried out without addition of alpha-olefin comonomer.

3. The process of claim 1, wherein the process is carried out with addition of alpha-olefin comonomer.

4. The process of claim 1, wherein the process is carried out in a slurry reactor.

5. The process of claim 2, wherein the process is carried out in a slurry reactor.

6. The process of claim 3 wherein the process is carried out in a slurry reactor.

7. The process of claim 1, wherein the step of contacting comprises feeding catalyst and cocatalyst separately into a polymerization reactor.

8. The process of claim 2, wherein the step of contacting comprises feeding catalyst and cocatalyst separately into a polymerization reactor.

9. The process of claim 3, wherein the step of contacting comprises feeding catalyst and cocatalyst separately into a polymerization reactor.

10. The process of claim 4, wherein the step of contacting comprises feeding catalyst and cocatalyst separately into a polymerization reactor.

11. The process of claim 1, wherein the step of contacting comprises cofeeding catalyst and cocatalyst into a polymerization reactor.

12. The process of claim 2, wherein the step of contacting comprises cofeeding catalyst and cocatalyst into a polymerization reactor.

13. The process of claim 3, wherein the step of contacting comprises cofeeding catalyst and cocatalyst into a polymerization reactor.

14. The process of claim 4, wherein the step of contacting comprises cofeeding catalyst and cocatalyst into a polymerization reactor.

15. The process of claim 1, wherein the cocatalyst is aluminum.

16. A process for producing polyethylene having a target density, the process comprising:
   (a) contacting, under polymerization conditions:
      (i) monomers comprising ethylene;
      (ii) supported chromium catalyst; and
      (iii) cocatalyst comprising a compound of formula $MR_3$, where M is a mixture of aluminum and boron, and each R is independently a linear or branched $C_1$ to $C_{12}$ alkyl group, to produce polyethylene having a deviation between the density of said polyethylene and said target density;
   (b) determining the density of said polyethylene; and
   (c) adjusting the concentration of cocatalyst in response to said deviation between the density of said polyethylene and said target density.

* * * * *